No. 768,379.

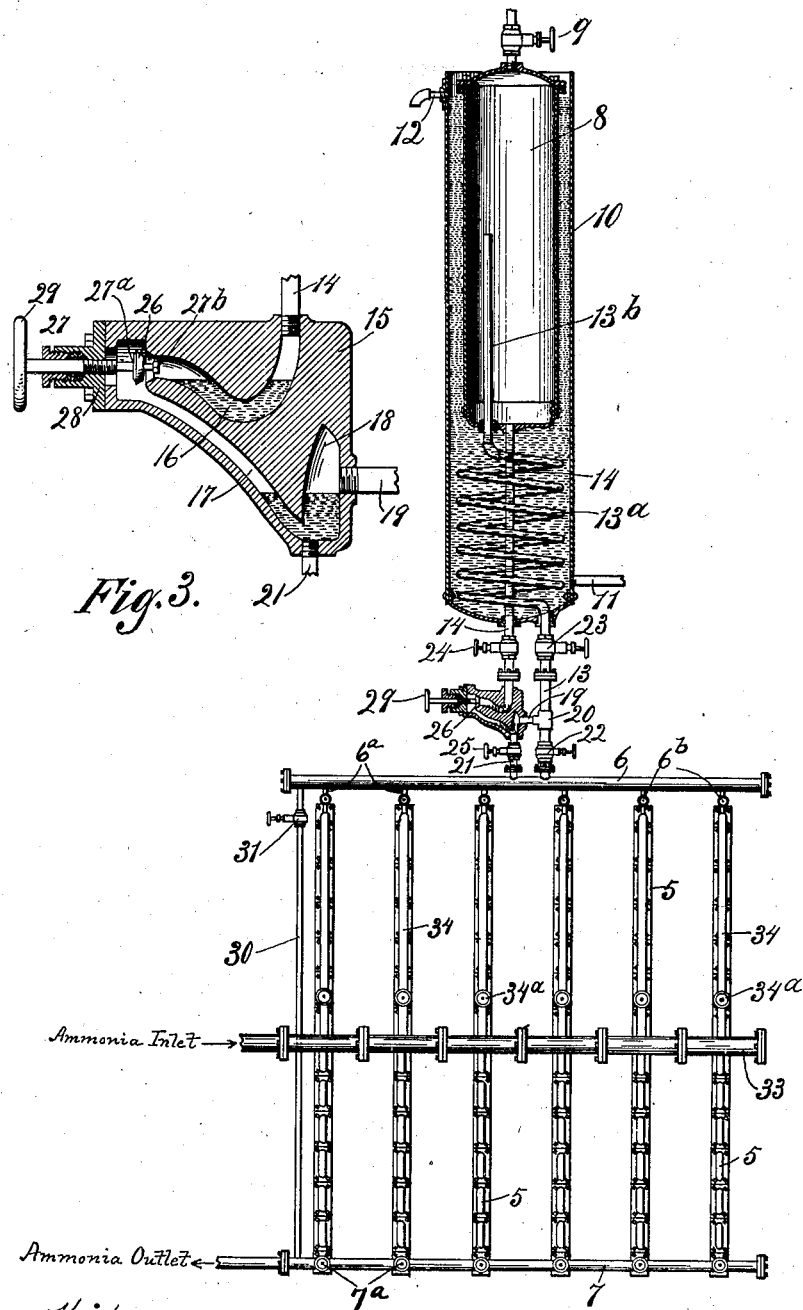

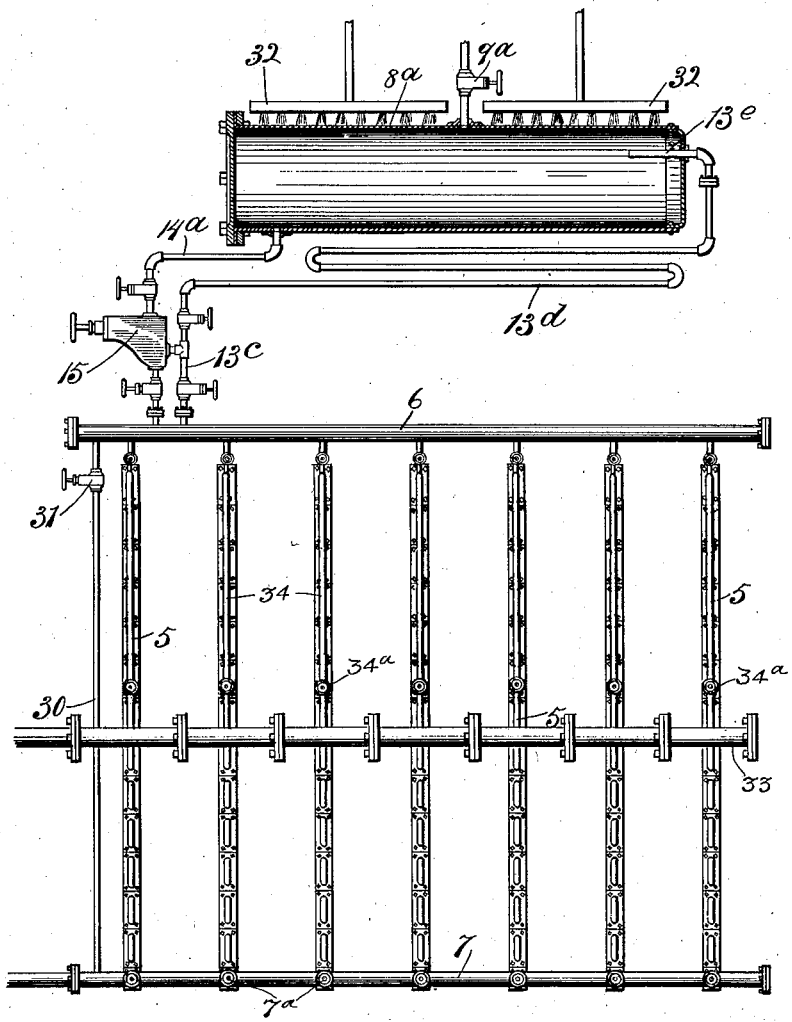

Patented August 23, 1904.

UNITED STATES PATENT OFFICE.

FREDERICK W. LANPHIER, OF CHICAGO, ILLINOIS, ASSIGNOR OF ONE-HALF TO JOHN W. FARLEY, OF LAGRANGE, ILLINOIS.

FOREIGN-GAS EXTRACTOR FOR REFRIGERATING SYSTEMS.

SPECIFICATION forming part of Letters Patent No. 768,379, dated August 23, 1904.

Application filed October 21, 1903. Serial No. 177,847. (No model.)

*To all whom it may concern:*

Be it known that I, FREDERICK W. LAN-PHIER, a citizen of the United States, residing at Chicago, in the county of Cook and State of Illinois, have invented certain new and useful Improvements in Foreign-Gas Extractors for Refrigerating Systems, of which the following is a specification.

My invention relates generally to refrigerating systems, and has reference more particularly to a new and improved device for relieving such systems of the presence of foreign gases.

In the practical operation of ammonia and similar refrigerating systems considerable annoyance is experienced by reason of the presence in the refrigerating agent of foreign gas or gases. These are principally air which leaks in along the piston-rods of the pumps and gases which are generated by the action of the heat of compression upon the lubricating-oils employed in the pumps. Heretofore, so far as I am aware, only comparatively crude and wasteful means have been resorted to to free the system of the presence of these foreign gases, such as a pipe or receptacle tapping the top pipe or coil of the condenser and provided with a valve on its outer end, by opening which the foreign gas collected therein might be discharged; but a serious objection to such a device lies in the fact that more or less ammonia-gas is bound to escape along with the foreign gas or gases, thus wasting the ammonia and necessitating shutting down the system. My invention has for its principal object to provide an improved device of this character which will successfully extract and discharge all foreign gases without involving the loss and waste of ammonia or necessitating shutting down the system; and to this end my invention in its broadest aspects contemplates the employment of a chamber or receptacle tapping a gas-collecting header disposed above and communicating with the top coil or coils of the condenser and provided with a means for discharging the foreign gases collected therein and also with means for condensing and returning to the condenser through said header any ammonia-gas that may rise therein along with the foreign gases.

My invention also contemplates the employment in connection with the means for returning such condensed ammonia-gas to the system of means in the nature of a trap for preventing any backing up of ammonia-gas from the condenser to the foreign-gas receptacle through the condensed-ammonia return pipe or conduit and also the provision of a connection between the return liquid-line and the header serving to prevent foreign gases from passing to the liquid receiver.

My invention in an improved embodiment thereof is illustrated in the accompanying drawings, wherein—

Figure 1 is an elevational view of the condenser of a refrigerating system having my improved attachment applied thereto and shown in central vertical section. Fig. 2 is a similar view illustrating the preferred form which my attachment takes when located in a horizontal rather than a vertical position above the condenser, and Fig. 3 is a detail vertical sectional view, enlarged, of a trap located in the condensed-ammonia return-pipe.

Referring to the drawings, 5 designates a series of rows of condenser-coils which are supplied with ammonia or other refrigerating agent through the usual inlet-header 33, connected with the several coils by inlet-pipes 34, carrying cut-off valves $34^a$.

6 designates a transversely-disposed overlying gas-collecting header connected with the several coils by short pipes $6^a$, containing cut-off valves $6^b$. The coils 5 are connected at their lower ends to the usual return liquid-line 7, constituting the ammonia-outlet, the communication of each coil with this pipe being controlled by a cut-off valve $7^a$. Superposed above the header 6 is a tank 8, provided in its upper end with a blow-off cock 9, which tank constitutes a foreign-gas receptacle. The tank 8 is surrounded by a larger tank or vessel 10, adapted to be maintained full of cooling-water by means of an inlet-pipe 11 at its lower end and an overflow-pipe 12 at its upper end. The header 6 communicates with the interior of the tank 8 through a pipe which is herein shown as consisting of a straight section 13, tapping the header 6 and the bottom of the water-tank 10, an intermediate coil-section 13$^a$, lying within the water-tank 10 beneath the lower end of the gas-receptacle 8, and a straight section 13$^b$, which taps the bottom of the tank 8 and extends upwardly for some distance therein. Tapping the lower end of the tank 8 is a pipe 14, which extends straight downwardly inside the coil 13$^a$ through the bottom of the outer tank 10 and enters a trap device 15. This latter in the form herein shown consists of a casting which has cored therein a downwardly-curved passage 16, Fig. 3, and communicating with the latter a downwardly-inclined passage 17, which joins at the lower end of the casting an upwardly-extending space or passage 18, which latter communicates freely with the pipe-section 13, already described, by a short pipe 19 and T-coupling 20. The trap-casting 15 is also connected at its lower end by a pipe-section 21 with the header 6 for drainage purposes, as hereinafter more particularly explained.

22 designates a cut-off valve located in the pipe-section 13 below the branch 19, leading to the trap 15. 23 is a similar valve located in the same pipe above the branch 19. 24 is a similar valve located in the pipe 14 above the trap 15, and 25 is a similar valve located in the pipe-section 21 beneath the trap.

26, Fig. 3, designates a valve-disk mounted on the inner end of a valve-stem 27, which extends through a suitably-packed bearing 28, with which it has a screw-threaded connection outside the trap-casting terminating in a hand-wheel 29. The disk 26 is slidable on the spindle 27 for a limited distance between a shoulder 27$^a$ and a nut 27$^b$ on the end of the spindle.

30 designates a pipe which is independent of the pipe system of the condenser and connects header 6 with the return liquid-line 7 at or about the point where the latter connects with the line to the receiver, this pipe being equipped with one or more cut-off valves 31.

The operation of the apparatus is substantially as follows: During the normal operation of the system while the condensed ammonia is undergoing cooling and liquefaction in the coils of the condenser 5 and is flowing off thence through the return liquid-line 7 to the receiver such foreign gas or gases as may be present therein will tend to rise into the header 6 through the connections of the several coils therewith and also through the pipe 30. This gas tending to rise will pass upwardly through the pipe-sections 13, 13$^a$, and 13$^b$ into the receiving-tank 8, collecting in the upper end of the latter. More or less ammonia-gas will pass upwardly with the foreign gases into the tank 8, but on coming into contact with the cold walls of the latter will condense and settling in the bottom will flow back through the pipe 14, the ports 16 and 17, the space 18, branch connecting-pipe 19, and lower end of pipe-section 13 into the header, whence it will rejoin the liquefied gas in the condenser and pass therewith to the receiver. At intervals as often as experience demonstrates the necessity or advisability the valves 23 and 24 are closed, and the blow-off cock 9 is then opened and the foreign gases are vented therethrough without loss or waste of ammonia-gas. It should be explained that a considerable portion of the ammonia-gas which rises with the foreign gases toward the chamber 8 is condensed in the coil-section 13$^a$ and flows back thence to the header through the pipe-section 13; but such ammonia-gas as is not condensed within the condenser-coil 13$^a$ will be condensed by the cold walls of the tank 8 and returned in the manner already described.

It will be observed that the formation of the duct 16 and also of the duct 17 and space 18 is such as to present a double liquid seal, one in the duct 16 and the other at the junction of the duct 17 and space 18, the function of these seals being to prevent the passage of ammonia-gas upwardly into the tank 8 through the liquid-ammonia return-pipe 14 and its connections to the header. Under normal conditions and pressures the liquid seals are sufficient for this purpose; but to provide against abnormal pressures, which might blow out the seals, I provide the back-pressure valve 26. This valve, which, as already explained, is slidable through a limited distance on its stem, normally stands slightly removed from its seat, so as to permit the downward flow of the condensed ammonia thereby; but in case of sudden and abnormal back pressure it will be instantly seated by the latter and will thus guard the return-pipe 14 against the backing up of ammonia-gas therethrough.

When for purposes of repairs or other reasons it is desired to absolutely close the connection between the tank 8 and the header 6 through the return-pipe 14 and its connections, this may be done by manipulating the hand-wheel 29 to force the valve-disk 26 hard to its seat. The pipe 21 and its valve 25 are normally idle, the valve being closed; but they are provided for the purpose of draining off the lower seal in the trap 15 when necessary for the purpose of repairs or other reasons. The valves 22, 23, and 24 are of course normally open; but by closing them both the condenser and the foreign-gas-collecting tank 8 are entirely cut off from the trap 15 and the pipe-sections lying between the upper valves 23 24 and the lower valves 22 25, so that said parts may be replaced or repaired without loss of gas from either of the underlying or superposed devices.

The pipe 30, shown as connecting the return liquid-line 7 with the header 6, performs an important function in collecting and delivering to the header and through the latter to the tank 8 a considerable percentage of the foreign gas which would otherwise pass off with the ammonia from the condenser to the receiver.

By manipulating the valves 34ª, 6ᵇ, and 7ª, connected with any one of the coils, said coil can be independently cut out of the system when necessary for any reason without interfering with the operation of the rest of the condenser.

Fig. 2 of the drawings illustrates an embodiment of the invention wherein the foreign-gas-receiving tank is disposed horizontally instead of vertically above the condenser and wherein a water-shower is used as a cooling agent for said foreign-gas collector and the pipe leading thereto from the header instead of a water-jacket, as in the previously-described construction. Referring briefly thereto, 8ª designates the horizontally-disposed receiver for the foreign gases provided with a blow-off cock 9ª and entered at one end by a pipe-section 13ᵉ, which is continuous with an intermediate coil 13ᵈ and a straight section 13ᶜ, tapping the condenser-head 6. To cool the gas-collector 8ª, so as to condense the ammonia-gas which finds its way therein, I may conveniently employ a jet or supply pipe 32, which delivers a considerable stream of cold water upon the top and sides of the tank, this water falling off the latter onto and over the coil 13ᵈ, and thus tending to condense a considerable part of the ammonia rising through the latter and return it directly to the system. The ammonia return-pipe is shown at 14ª and, as in the construction described in Fig. 1, taps the lowest point of the gas-collecting chamber in order to insure the constant drainage of any liquid ammonia collecting therein and its return to the system through the trap 15. For convenience in carrying the trap 15 beyond the end of the tank 8ª and out of the reach of the water-drip therefrom the pipe 14ª has a horizontal section, as shown, between the upper end of the trap and the bottom of the gas-receiving tank. As regards its operation, the modified form of the invention illustrated in Fig. 2 is identical with that shown in Fig. 1, such a form being preferably employed in special situations wherein there is not sufficient room or space directly over the condenser for a vertical or upright foreign-gas-extracting device.

It will be evident that within the purview of the invention as hereinabove described considerable latitude might be exercised in respect to the particular construction and relative location and arrangement of the several parts and elements of the device without departing from the real spirit and gist of the invention. Hence I do not limit the invention to such details of construction and relative arrangement as are shown in the accompanying drawings and particularly described, except to the extent indicated in specific claims.

I claim—

1. In an apparatus for the purpose described, the combination with the condenser of a refrigerating system, the supply and draw-off pipes, and a superposed gas-collecting header communicating with the top pipe of the condenser, of a foreign-gas-collecting tank, a pipe connecting the interior thereof with the said header, another pipe constituting a return-pipe for the refrigerating agent from said tank to the said header, and means for discharging the foreign gas from the upper portion of said tank, substantially as described.

2. In an apparatus for the purpose described, the combination with a multiple coil-condenser of a refrigerating system, the supply and draw-off pipes, and a superposed gas-collecting header disposed across and communicating with the top pipes of the several coils of the condenser, of a foreign-gas-collecting tank, a pipe connecting the interior thereof with the said header, means for cooling the walls of said tank whereby to condense the refrigerating agent therein, another pipe constituting a return-pipe for the condensed refrigerating agent from the bottom of said tank to the said header, and means for discharging the foreign gas from the upper end of said tank, substantially as described.

3. In an apparatus for the purpose described, the combination with a tank and a pipe connecting the interior thereof with the condenser of a refrigerating system, said pipe including a condenser-coil interposed therein between the tank and the condenser, of means for cooling said tank and condenser-coil whereby to condense ammonia-gas therein, a return-pipe for the condensed ammonia from the bottom of said tank to the condenser, and means for discharging the foreign gas from the upper end of said tank, substantially as described.

4. In an apparatus for the purpose described, the combination with a foreign-gas-receiving tank and a pipe connecting the interior thereof with the condenser of a refrigerating system, of a return-pipe for the condensed ammonia from the bottom of said tank to the condenser, and a trap interposed in said return-pipe to prevent backing up of ammonia-gas from the condenser therethrough, substantially as described.

5. In an apparatus for the purpose described, the combination with a foreign-gas-receiving tank and a pipe connecting the interior thereof with the condenser of a refrigerating system, of a return-pipe for the condensed ammonia from the bottom of said tank to the condenser, and a trap containing a liquid seal interposed in said return-pipe, substantially as described.

6. In an apparatus for the purpose described, the combination with a foreign-gas-receiving tank and a pipe connecting the interior thereof with the condenser of a refrigerating system, of a return-pipe for the condensed ammonia from the bottom of said tank to the condenser, and a trap containing a double liquid seal interposed in said return-pipe, substantially as described.

7. In an apparatus for the purpose described, the combination with a foreign-gas-receiving tank and a pipe connecting the interior thereof with the condenser of a refrigerating system, of a return-pipe for the condensed ammonia from the bottom of said tank to the condenser, and a trap having a pair of liquid seals and a check-valve between said seals interposed in said return-pipe, substantially as described.

8. In an apparatus for the purpose described, the combination with a foreign-gas-receiving tank and a pipe connecting the interior thereof with the condenser of a refrigerating system, of a return-pipe for the condensed ammonia from the bottom of said tank to the condenser, a trap interposed in said return-pipe to prevent backing up of ammonia-gas from the condenser therethrough, and cut-off and drain valves interposed in said pipes between said tank and the condenser, substantially as described.

9. The combination with the supply and draw-off pipes and condensing-coils of an ammonia-condenser, of a gas-collecting header disposed above and communicating with the top pipes of said coils, a return liquid-line, a foreign-gas-collecting tank connected to said header, and a pipe directly connecting the said header with the discharging end of the return liquid-line, said pipe being independent of the pipe system of the condenser and adapted to transmit foreign gas from the latter point externally of the condensing-coils to and through said header and thence to the foreign-gas-collecting tank, substantially as described.

10. The combination with the header, the return liquid-line, and the interposed condensing-coils of an ammonia-condenser, of a foreign-gas-receiving tank connected to said header, means for cooling the walls of said tank, a return-pipe for condensed ammonia from the bottom of said tank to said header, a trap interposed in said return-pipe, and a pipe directly connecting the header with the discharging end of the return liquid-line adapted to transmit foreign gas from the latter point to and through said header and thence to the foreign-gas-receiving tank, substantially as described.

FREDERICK W. LANPHIER.

Witnesses:
SAMUEL N. POND,
FREDERICK C. GOODWIN.